United States Patent
Kamei et al.

(10) Patent No.: US 12,174,159 B2
(45) Date of Patent: Dec. 24, 2024

(54) LIQUID CHROMATOGRAPH

(71) Applicant: SHIMADZU CORPORATION, Kyoto (JP)

(72) Inventors: Kota Kamei, Kyoto (JP); Daisuke Kitabayashi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 224 days.

(21) Appl. No.: 18/095,858

(22) Filed: Jan. 11, 2023

(65) Prior Publication Data
US 2023/0258614 A1    Aug. 17, 2023

(30) Foreign Application Priority Data

Feb. 14, 2022    (JP) ................. 2022-020835

(51) Int. Cl.
*G01N 30/38*    (2006.01)
*G01N 30/02*    (2006.01)
*G01N 30/32*    (2006.01)

(52) U.S. Cl.
CPC ............ *G01N 30/38* (2013.01); *G01N 30/32* (2013.01); *G01N 2030/027* (2013.01); *G01N 2030/326* (2013.01); *G01N 2030/328* (2013.01)

(58) Field of Classification Search
CPC ....... G01N 2030/027; G01N 2030/326; G01N 2030/328; G01N 30/20; G01N 30/22; G01N 30/32; G01N 30/34; G01N 30/36; G01N 30/38
See application file for complete search history.

(56) References Cited

U.S. PATENT DOCUMENTS

| | | | |
|---|---|---|---|
| 9,410,543 B2 * | 8/2016 | Tokuo | F04B 17/03 |
| 2002/0112530 A1 | 8/2002 | Kitagawa | |
| 2020/0278329 A1 * | 9/2020 | Yanagibayashi | F04B 11/0058 |

FOREIGN PATENT DOCUMENTS

| | | | |
|---|---|---|---|
| JP | H02-238358 A | 9/1990 |
| JP | H07-077521 A | 3/1995 |
| JP | 2006-125367 A | 5/2006 |
| JP | 4590750 B2 | 9/2010 |

* cited by examiner

*Primary Examiner* — Kristina M Deherrera
*Assistant Examiner* — Gedeon M Kidanu
(74) *Attorney, Agent, or Firm* — Renner, Otto, Boisselle & Sklar, LLP (57) ABSTRACT

A liquid chromatograph (1) includes a liquid-sending unit (20) for sending a mobile phase from a reservoir (11) to a column (14) through a tube (12) at a predetermined pressure. The unit (20) includes a pump (21) having a suction port (211) connected to the reservoir and an ejection port (212) connected to the tube directly or via another pump. A check valve (232) is provided for the ejection port. For the pre-compression process for opening this valve, a pressure application controller (27) controls the pressure applied to the mobile phase within the pump, based on the compressibility of the mobile phase and the amount of compression of the inner wall of the pump resulting from the pressure application, so as to reach the pressure at which the check valve opens before the mobile phase suctioned from the suction port is to be ejected from the ejection port.

4 Claims, 6 Drawing Sheets

LIQUID CHROMATOGRAPH

TECHNICAL FIELD

The present invention relates to a liquid chromatograph.

BACKGROUND ART

Liquid chromatographs have been widely used as a type of device for analyzing components contained in a liquid sample. In a liquid chromatograph, a liquid sample is carried into a column by a flow of a mobile phase supplied at a constant flow rate. The various components contained in the liquid sample are temporally separated from each other by the column and subsequently subjected to a measurement using a detector. During this process, a certain amount of pressure (from a few MPa to tens of MPa) acts on the liquid-sending passage depending on the flow rate as well as the kind and composition of the mobile phase. If only a single pump were used for supplying the mobile phase, a period of time with no liquid-supply pressure would arise within a period of time from the suction of the mobile phase to its ejection. In order to avoid this situation and continuously supply the mobile phase at a constant flow rate, a liquid-sending unit including two pumps combined together has conventionally been used.

The two pumps in the liquid-sending unit are connected in parallel or in series. In the case of the parallel connection, the two pumps are driven with the same period and in opposite phase (i.e., when one pump is in the suction phase, the other is in the ejection phase) so that either one of the two pumps is in the ejection phase at any point in time. In the case of the series connection, when the pump on the upstream side is within the period of time for ejecting the mobile phase, the pump on the downstream side is driven so as to suction a portion of the mobile phase ejected from the upstream pump while allowing the remaining portion to pass through, and when the pump on the upstream side is within the period of time for suctioning the mobile phase (with no ejection of the mobile phase), the pump on the downstream side is driven so as to eject the previously suctioned portion of the mobile phase.

In the case of the parallel connection, a check valve is provided at each of the suction and ejection ports of each of the two pumps. In the case of the series connection, a check valve is provided at each of the suction and ejection ports of the pump on the upstream side. In the parallel connection, the check value provided at the suction port of each pump is intended to prevent the mobile phase from flowing back to the suction port when this pump ejects the mobile phase, while the check valve provided at the ejection port of the same pump is intended to prevent the mobile phase from flowing into this pump through this ejection port when the other pump ejects the mobile phase. The check valves provided in the pump on the upstream side in the series connection also act in a similar manner. By comparison, the pump on the downstream side in the series connection has neither the check valve on its ejection-port side since one half of the mobile phase must be allowed to pass through even during the suction phase, nor the check value in its suction-port side since the back flow of the mobile phase in the ejection phase is already prevented by the check valve provided at the ejection port of the pump on the upstream side.

In a pump provided with a check valve, when the operational phase changes from the phase for suctioning the mobile phase to the phase for ejecting the same, the check value will not open until the pressure within the pump becomes equal to or higher than a certain value. Therefore, in order to make the check valve open simultaneously with the beginning of the ejection, an operation called "precompression" is performed, in which the pressure of the mobile phase within the pump is increased beforehand after the completion of the suction and before the beginning of the ejection of the mobile phase (for example, see Patent Literature 1).

The pressure of the mobile phase within the pump during the precompression (i.e., while the check valve is still closed) is determined by the amount of change in the inner volume of the pump (this change corresponds to the travel distance of the plunger) and the compressibility of the mobile phase. The compressibility of the mobile phase varies depending on the component of the mobile phase. Therefore, the amount of change in inner volume during the precompression (the travel distance of the plunger) should be determined for each mobile phase to be used.

CITATION LIST

Patent Literature

Patent Literature 1: JP 2006-125367 A
Patent Literature 2: JP H07-077521 A

SUMMARY OF INVENTION

Technical Problem

Conventionally, stainless steel or other metallic materials have been used for the component parts of the liquid-sending unit. However, the use of a metallic material may possibly cause a trace amount of metal ion to be dissolved in the mobile phase and detected, producing an unfavorable effect on the analysis result. Therefore, some liquid chromatographs developed in recent years employ a liquid-sending unit in which a type of resin that barely dissolves in the mobile phase is used as the material for specific portions that come in contact with the mobile phase among the component parts of the liquid-sending unit. As for the pumps in this liquid-sending unit, a pump which is entirely made of resin, or one in which the portion that comes in contact with the mobile phase is made of resin, with the surrounding areas made of metal, is used.

These types of pumps which use resin materials have the problem that the timing of the ejection of the mobile phase is delayed because the passage is expanded during the pressurizing phase, which will cause a pressure deficiency if the precompression is performed under the same condition as applied to the conventional metallic pump, and it is not until the plunger is further driven forward that the check valve becomes open.

Furthermore, when a low-pressure gradient control is performed with the liquid-sending unit including the previously described type of pump using a resin material, the following problem occurs. In general, a control process in which the composition of the mobile phase supplied to the column is continuously varied by continuously varying the mixture ratio of a plurality of solvents whose components are different from each other is called a gradient control. A type of gradient control which uses a single liquid-sending unit and obtains a mobile phase by mixing a plurality of solvents on the downstream side from the pumps is called a low-pressure gradient control. In a low-pressure gradient control, for example, a mobile phase consisting of water and acetonitrile mixed together is supplied to a column in a controlled manner so that the mixture ratio of the water and acetonitrile is continuously varied from 90:10 to 50:50 in 20 minutes. In this process, a trace amount of compressed solvent (compressed residual liquid) remains within the pump at the point in time where the ejection of the solvent from the pump has been completed. Therefore, after the beginning of the suctioning operation, a new amount of solvent cannot be suctioned until the pressure of the compressed residual liquid decreases to a certain value (i.e., until the completion of depressurization). Taking this into account, the travel distance of the plunger during the period from the completion of depressurization to the completion of suction is divided according to the target value of the mixture ratio of the solvents so as to suction each solvent into the pump so that the mixture ratio of the solvents will be the target value (see Patent Literature 2). However, when a liquid-sending unit including a resin-made pump is used for the low-pressure gradient control, a discrepancy occurs between the actual mixture ratio in the mobile phase ejected from the pump and the target value.

The problem to be solved by the present invention is to provide a liquid chromatograph including a liquid-sending unit that can perform the precompression with a predetermined pressure as well as a low-pressure gradient control at a predetermined mixture ratio, regardless of the type of material used for the pump.

Solution to Problem

The first mode of the present invention developed for solving the previously described problems is a liquid chromatograph including a liquid-sending unit configured to send a mobile phase held in a reservoir section to a column through a liquid-sending tube at a predetermined pressure, where:
  the liquid-sending unit includes:
    a pump including: a pump chamber, a plunger configured to reciprocate in the pump chamber, a suction port provided for the pump chamber and configured to be connected to the reservoir section, as well as an ejection port provided for the pump chamber and configured to be connected to the liquid-sending tube directly or via another pump;
    a check valve connected to the ejection port;
    an input section configured to allow for input of information concerning the compressibility of the mobile phase and information concerning the amount of change in the inner volume of the pump chamber caused by a change in the pressure within the pump chamber; and
    a pressure application controller configured to control the plunger, based on the information inputted through the input section, in such a manner that the pressure applied to the mobile phase within the pump chamber becomes a check-valve-opening pressure at which the check valve opens, before the mobile phase suctioned from the suction port is to be ejected from the ejection port.

The second mode of the present invention is a liquid chromatograph including a liquid-sending unit configured to send a mobile phase to a column through a liquid-sending tube at a predetermined pressure, the mobile phase consisting of a mixture of a plurality of solvents whose components are different from each other, where:
  the liquid-sending unit includes:
    a solvent supplier including a plurality of solvent supply passages and a switching mechanism configured to select one solvent supply passage from the plurality of solvent supply passages in a switchable manner;
    a pump including: a pump chamber, a plunger configured to reciprocate within the pump chamber, a suction port provided for the pump chamber and configured to be connected to the solvent supplier, as well as an ejection port provided for the pump chamber and configured to be connected to the liquid-sending tube directly or via another pump;
    an input section configured to allow for input of information concerning the compressibility of the mobile phase and information concerning the amount of change in the inner volume of the pump chamber caused by a change in the pressure within the pump chamber; and
    a passage-switching controller configured to control the timing of the switching of the solvent supply passages by the switching mechanism, based on the information inputted through the input section.

Advantageous Effects of Invention

The pressure of the mobile phase within the pump chamber actually depends on not only the compressibility of the mobile phase mentioned earlier, but also the inner volume of the pump chamber which changes due to the compression of specific parts of the pump, such as the wall of the pump chamber, the plunger, the seal member provided in the gap between the plunger and the wall of the pump chamber, as well as the passage from the pump chamber to the check valve, caused by the pressure application. The amount of change in the inner volume of the pump chamber depends on the material of the wall of the pump chamber and other related parts. This change is negligibly small if the material is a metallic material, whereas it cannot be ignored if the material is a resin or similar material that easily deforms when compressed. Accordingly, the liquid chromatograph according to the first mode controls the plunger based on not only the compressibility of the mobile phase but also the amount of change in the inner volume of the pump chamber caused by a change in pressure, in such a manner that the pressure applied to the mobile phase within the pump chamber becomes a check-valve-opening pressure before the mobile phase suctioned from the suction port is to be ejected from the ejection port. The plunger control can be performed by adjusting the position, moving speed and other parameters of the plunger with respect to time, while the amount of change in the inner volume of the pump chamber can be determined by a preliminary experiment (or the like). By controlling the plunger in this manner, the mobile phase within the pump chamber reaches a pressure capable of opening the check valve at the point in time where the mobile phase is to be ejected from the ejection port, so that the mobile phase can be ejected from the pump at an appropriate timing. Additionally, an operator using the input section enters information concerning the compressibility of the mobile phase and information concerning the amount of change in the inner volume of the pump chamber resulting from the compression of the wall of the pump chamber and other members caused by a change in the pressure within the pump chamber. Based on these pieces of information, the pressure application controller controls the aforementioned pressure, i.e., the pressure applied to the mobile phase within the pump. Therefore, the pressure control can be appropriately performed even when the compressibility of the mobile phase or the amount of change in the inner volume of the pump chamber has been changed due to a change in the kind of mobile phase to be used or due to the replacement of the pump.

In a low-pressure gradient control, if a change in the inner volume of the pump chamber occurs due to a change in the pressure within the pump chamber, the timing at which the depressurization is completed and the suction of the solvent becomes possible will change as compared to the case where no change in inner volume occurs. If this change in the timing of the completion of the depressurization is not considered in switching the solvent to be introduced into the pump chamber, a discrepancy occurs between the actual mixture ratio and the target value. Accordingly, in the second mode of the liquid chromatograph, the timing of the switching of the solvent supply passages by the switching mechanism is controlled based on the change in the inner volume of the pump chamber caused by a change in the pressure within the pump chamber in addition to the compressibility of the solvent within the pump chamber. By this control, the timing of the switching of the solvent supply passages can be determined corresponding to a change in the timing of the completion of the depressurization, so that a plurality of solvents can be mixed at the target mixture ratio. Additionally, as in the liquid chromatograph according to the first mode, the timing of the switching of the solvent supply passages can be appropriately controlled even when the compressibility of the solvent or the amount of change in the inner volume of the pump chamber has been changed due to a change in the kind of solvent to be used or due to the replacement of the pump.

DESCRIPTION OF EMBODIMENTS (1) First Embodiment

Figure 1:
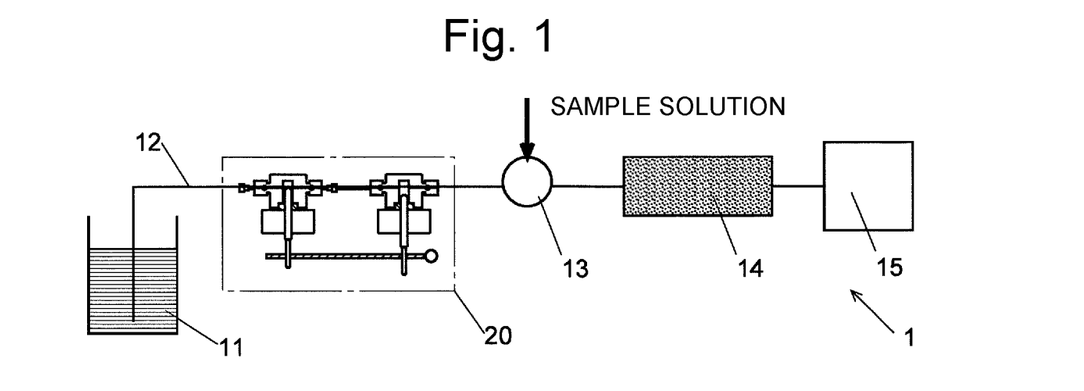
FIG. 1 is a schematic configuration diagram showing the first embodiment of the liquid chromatograph according to the present invention.

The first embodiment of the liquid chromatograph according to the present invention is hereinafter described using FIGS. 1-4. FIG. 1 is a schematic configuration diagram showing the liquid chromatograph 1 according to the present embodiment. This liquid chromatograph 1 includes a reservoir tank (reservoir section) 11 for holding a mobile phase, a liquid-sending tube 12 with one end connected to the reservoir tank 11, a pump unit 20 provided in the line of the liquid-sending tube 12, a sample injection unit (injector) 13 located on the downstream side from the pump unit 20 in the line, a column 14 located on the downstream side from the sample injection unit 13 in the line, and a detector 15 on the downstream side from the column 14 in the line. The sample injection unit 13 is a device for injecting a sample solution into the mobile phase. The column 14 is a device for temporally separating various components contained in the sample solution injected into the mobile phase. The detector 15 is a device for sequentially detecting the various components separated from each other by the column 14. A mass spectrometer, photodiode array (PDA) detector, ultraviolet visible spectrophotometric detector or other devices can be used as the detector 15. In the first embodiment, the pump unit 20 corresponds to the previously described liquid-sending unit. The component parts other than the pump unit 20 are similar to those used in conventional liquid chromatographs.

Figure 2:
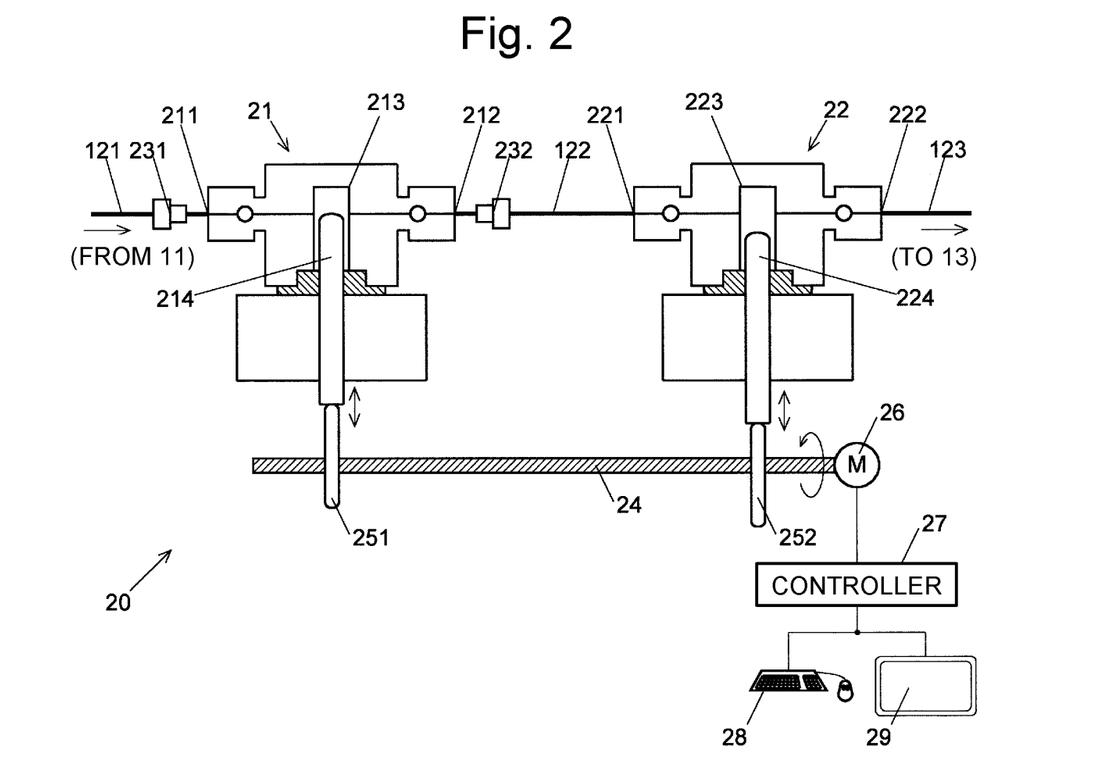
FIG. 2 is a diagram showing the configuration of the liquid-sending unit in the liquid chromatograph according to the first embodiment.

As shown in FIG. 2, the pump unit 20 has a first pump 21 and a second pump 22. The liquid-sending tube 12 has the following liquid-sending tubes in the pump unit 20 as well as before and after the same unit 20: a first liquid-sending tube 121 connecting the reservoir tank 11 and the suction port 211 of the first pump 21 (first suction port); a second liquid-sending tube 122 connecting the ejection port 212 of the first pump 21 (first ejection port) and the suction port 221 of the second pump 22 (second suction port); and a third liquid-sending tube 123 connecting the ejection port 222 of the second pump 22 (second ejection port) and the sample injection unit 13. Thus, the first and second pumps 21 and 22 are connected in series by the second liquid-sending tube 122.

The first suction port 211 and the first ejection port 212 are provided with a first check valve 231 and a second check valve 232, respectively. Both of the first and second check valves 231 and 232 have the function of preventing the mobile phase from flowing back toward the reservoir tank 11.

It should be noted that neither the second suction port 221 nor the second ejection port 222 of the second pump 22 is provided with a check valve. This is due to the fact that the backflow of the mobile phase at the second suction port 221 can be prevented by the second check valve provided for the first ejection port 212 of the first pump 21, while the second ejection port 222 must allow one half of the mobile phase suctioned through the second suction port 221 to pass through even in the suction phase of the second pump 22, as will be described later.

As shown in FIG. 2, the first pump 21 includes a first cylinder (first pump chamber) 213 connected to the first suction port 21 and the first ejection port 212, as well as a first plunger 214 which reciprocates within the first cylinder 213. The material used for the first cylinder 213 and the first plunger 214 in the present embodiment is polyether ether ketone (PEEK), which is a kind of resin. PEEK is advantageous in that it barely dissolves in the mobile phase. On the other hand, PEEK has the characteristic that it becomes compressed and thereby causes a change in the inner volume of the first cylinder 213 when the first plunger 214 is pushed and applies a pressure to the mobile phase within the first cylinder 213. It is possible that the wall of the first cylinder 213 and/or the first plunger 214 are entirely made of PEEK, or that only their surface portions which come in contact with the mobile phase are made of PEEK while the other portions are made of metal. A kind of resin that is different from PEEK may also be used.

Within the gap between the wall of the first cylinder 213 and the first plunger 214, a seal member (not shown) for preventing the mobile phase from leaking through the gap is provided.

The second pump 22 includes a second cylinder (second pump chamber) 223 and a second plunger 224 which are similar to the first cylinder 213 and the first plunger 214 of the first pump 21 in terms of the structure, inner volume and material.

As is also shown in FIG. 2, the pump unit 20 further includes a cam shaft 24, a first cam 251 and a second cam 252 fixed to the cam shaft 24, a stepper motor 26 for rotating the cam shaft 24, and a controller 27 for controlling the rotation speed of the stepper motor 26. Additionally, the liquid chromatograph 1 is provided with an input device (input unit 28), such as a keyboard and a mouse, as well as a display device (display unit 29) so that it can receive an input of the conditions of the control by the controller 27 from the input unit 28 and display those conditions on the display unit 29.

The first cam 251, which is in contact with the rear end of the first plunger 214, produces a reciprocating motion of the first plunger 214 by rotating with the cam shaft 24. The second cam 251, which is in contact with the rear end of the second plunger 224, produces a reciprocating motion of the second plunger 224 by a similar mechanism to the first cam 251. The shapes of the first and second cams 251 and 252 are determined so that the speed of the second plunger 224 is always equal to one half of the speed of the first plunger 214. In principle, the first and second plungers 214 and 224 move in the opposite directions to each other (so that the second pump 22 ejects the mobile phase when the first pump 21 suctions the mobile phase, whereas the second pump 22 suctions the mobile phase when the first pump 21 ejects the mobile phase). However, it should be noted that both the first plunger 214 and the second plunger 224 are pushed in the forward direction at the timing to switch the mobile-phase-ejecting pump between the first pump 21 and the second pump 22 as well as during the precompression process, which will be described later.

An operation of the pump unit 20 is hereinafter described. As the cam shaft 24 rotates, the first and second cams 251 and 252 also rotate and thereby produce a reciprocating motion of each of the first and second plungers 214 and 224. When the first pump 21 is ejecting the mobile phase from the first ejection port 212 (i.e., when the first plunger 214 is moving forward), the second pump 22 suctions, from the second suction port 221, the mobile phase ejected from the first ejection port 212 (i.e., the second plunger 224 moves backward). The second pump 22 suctions only one half of the amount of mobile phase ejected from the first pump 21, allowing the remaining half of the mobile phase to pass through and flow out of the second ejection port 222. On the other hand, when the first pump 21 is suctioning the mobile phase from the first suction port 211, the second pump 22 ejects the previously suctioned half of the mobile phase from the second ejection port 222. Thus, the mobile phase is constantly supplied at an almost fixed pressure and flow rate, regardless of the suction/ejection phase of each pump.

When the first pump 21 ejects the mobile phase, the mobile phase within the first pump 21 is pressed not only toward the first ejection port 212 but also toward the first suction port 211. However, the first check valve 231 prevents the mobile phase from flowing back to the reservoir tank 11. When the first pump 21 suctions the mobile phase, the second check valve 232 prevents the mobile phase within the second liquid-sending tube 122 and the second pump 22 from flowing back to the first pump 21. When the second pump 22 ejects the mobile phase, the mobile phase within the second pump 22 is pressed not only toward the second ejection port 222 but also toward the second suction port 221. However, the second check valve 232 prevents the mobile phase from flowing back to the first pump 21.

A precompression process is hereinafter described. When the first pump 21 ejects the mobile phase, the second check value 232 is not opened and the mobile phase cannot be actually ejected until the pressure within the first pump 21 becomes equal to or higher than a predetermined value (the "check-valve-opening pressure" mentioned earlier). Accordingly, in the pump unit 20 according to the present embodiment, a precompression operation for increasing the pressure of the mobile phase within the first pump 21 to a level equal to or higher than the check-valve-opening pressure is performed after the completion of the suction of the mobile phase in the first pump 21 and before the beginning of the ejection, as will be hereinafter described. The second pump 22 does not require precompression since this pump is not provided with a check valve.

Let V be the volume of the inner space for containing the mobile phase within the first pump 21 at the completion of the suction phase, let $\Delta V$ be the amount of change in the inner volume of the first pump 21 (which corresponds to the travel distance of the plunger) during the period from the state where the suction phase has been completed until the second check valve 232 is opened (i.e., during the precompression period), let $\Delta P$ be the amount of change in the pressure of the mobile phase within the first pump 21 during the precompression period ($\Delta P$ is determined by the structure of the second check valve 232), and let $\beta$ be the compressibility of the mobile phase.

In the case of a conventional liquid-sending unit, the travel distance of the plunger during the precompression period is determined so that $\Delta V$ satisfies the following relationship:

$$\Delta V = \beta V \Delta P \quad (1)$$

Since compressibility $\beta$ changes depending on the component of the mobile phase, $\Delta V$ should be determined for each component of the mobile phase.

However, as in the present embodiment, when a pump (first pump 21) made of a material that becomes compressed due to the application of the pressure is used, $\Delta V$ depends on not only the compressibility of the mobile phase shown in equation (1); it is also necessary to consider a change in the inner volume of the pump resulting from the compression of each of the members forming the pump, such as the wall of the pump chamber, plunger and seal member. Therefore, in the present embodiment, the amount of change in the inner volume of the pump due to the deformation caused by the application of the pressure to the mobile phase within the first pump 21 is defined as $\alpha \Delta P$, and the travel distance of the plunger during the precompression period is determined so that $\Delta V$ satisfies the following relationship:

$$\Delta V = (\beta V + \alpha) \Delta P \quad (2)$$

The value of α depends on the material of the pump, and therefore, does not need to be changed as long as the first pump 21 is not replaced by a new pump made of a different material. Therefore, it is normally possible to assume that the value of α is a constant. This allows ΔV to be determined by inputting only the compressibility β according to the component of the mobile phase. When the first pump 21 has been replaced by a new one, α should be changed to a value determined by the material of the new first pump 21.

Figure 3:
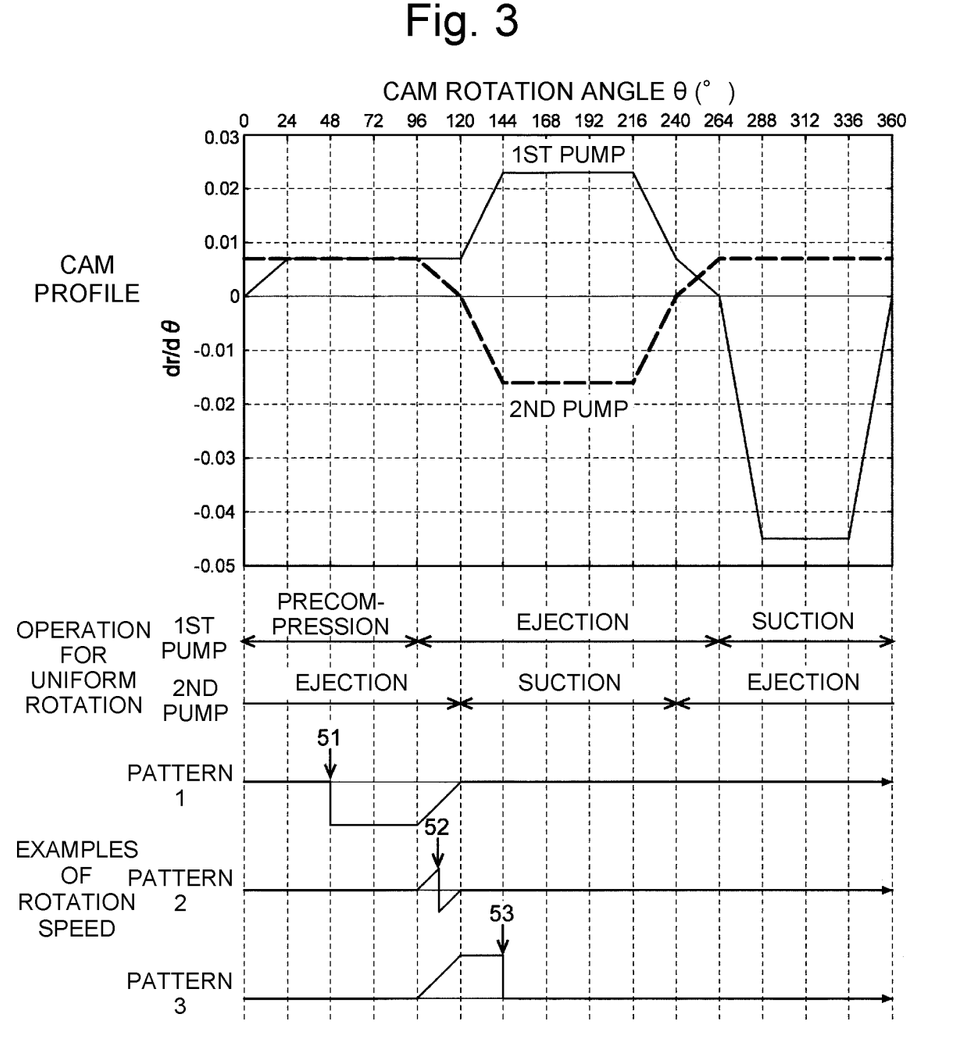
FIG. 3 is a diagram showing a cam profile in the liquid-sending unit in the liquid chromatograph according to the first embodiment, an operation of the pumps during a uniform rotation of the cam, and an example of the rotation speed of the cam.

Next, a description of the operation of the first and second cams 251 and 252, mainly focused on the precompression period, is given referring to FIG. 3. The graph in the upper section of FIG. 3, labeled as "Cam Profile", shows the relationship between the rotation angle θ of the cam shaft 24 (as well as the first and second cams 251 and 252) and the moving speed dr/dθ of each plunger (the first and second plungers 214 and 224). The moving speed dr/dθ of the plunger is the amount of motion of the plunger per unit angle (1 degrees) of the rotation of the cam shaft 24 (note that it is not the speed defined as a distance divided by time). This relationship between θ and dr/dθ is determined by the shape of the cam. A positive value of dr/dθ means that the plunger is being pushed in the forward direction, whereas a negative value of dr/dθ means that the plunger is being pulled in the backward direction.

With the cam profile thus determined, the operational phases of the two pumps during a uniform rotation of the cam shaft 24 will be as shown by the chart in the middle section of FIG. 3: The first pump 21 ejects the mobile phase when the rotation angle θ is from 96 degrees to 264 degrees, suctions the mobile phase when the rotation angle θ is from 264 degrees to 360 (or 0) degrees, and pre-compresses the mobile phase when the rotation angle θ is from 0 degrees to 96 degrees. The angle of 96 degrees, which is set as the angle at which the precompression is completed when the rotation of the cam shaft 24 is uniform, corresponds to the "reference rotation angle", which will be described later. The value of dr/dθ for the precompression is set to be lower than the value for the ejection. On the other hand, the second pump 22 ejects the mobile phase when the rotation angle θ is from 240 degrees via 360 degrees (0 degrees) to 120 degrees and suctions the mobile phase when the rotation angle θ is from 120 degrees to 240 degrees. While the rotation angle θ is within a range from 96 degrees to 120 degrees, the second pump 22 continues ejecting the mobile phase, with the moving speed dr/dθ of the second plunger 224 gradually decreasing with the rotation of the cam shaft 24. Therefore, the first pump 21 maintains the moving speed dr/dθ of the first plunger 214 at the value for the precompression (the value of dr/dθ is set to be lower than when θ is 120 degrees or larger) so as to avoid an excessive amount of ejection of the mobile phase. When the rotation angle θ is from 240 degrees to 264 degrees, both the first pump 21 and the second pump 22 are ejecting the mobile phase. Therefore, the moving speed dr/dθ of the first plunger 214 and that of the second plunger 224 are regulated so that the flow rate of the mobile phase supplied to the third liquid-sending tube 123 is maintained at a constant level.

The previously demonstrated timing of the completion of the precompression (the timing to switch from the precompression to the ejection) in the first pump 21 during the uniform rotation of the cam shaft 24 is determined in accordance with the timing in the case of supplying a specific kind of mobile phase by using a specific pump as the first pump 21. In practice, the timing of the completion of the precompression varies depending on the material of the pump and the component of the mobile phase according to equation (2). In the present embodiment, on the assumption that the shapes of the first and second cams 251 and 252 (the cam profile in the upper section of FIG. 3) are fixed and independent of the material of the first pump 21 as well as the component of the mobile phase, the rotation speed of the cam shaft 24 is set by the hereinafter described method so as to adjust the timing of the completion of the precompression for each material of the first pump 21 and for each kind of component of the mobile phase. The controller 27 controls the stepper motor 26 so as to make the cam shaft 24 rotate according to the set rotation speed.

If the material of the first pump 21 is harder than that of the specific pump mentioned earlier, or if the compressibility of the mobile phase is lower than that of the specific mobile phase mentioned earlier, the value of ΔV in equation (2) will be smaller, so that the completion of the precompression will be earlier than the timing which was set during the uniform rotation of the cam shaft 24. In that case, the mobile phase already begins to be ejected from the first pump 21 at a rotation angle smaller than 120 degrees at which the precompression is still ongoing if the rotation is uniform. Taking this into account, the rotation speed is controlled according to Pattern 1 in the examples of the rotation speed shown in the lower section of FIG. 3, so as to make the rotation speed lower than in the case of the uniform rotation from the rotation angle at which the precompression is actually completed (denoted by reference sign 51 in FIG. 3, which is the "check-valve-open rotation angle", 48 degrees in the example of FIG. 3) to the angle corresponding to the completion of the precompression under the uniform rotation (96 degrees). The rotation speed during this period of time is determined so that the sum of the flow rate of the mobile phase ejected from the first pump 21 and passing through the second pump 22, and the flow rate of the mobile phase ejected from the second pump 22 by the operation of the second pump 22 itself, will be equal to the intended amount of ejection from the second pump 22. Accordingly, after the completion of the precompression, the third liquid-sending tube 123 is supplied with the mobile phase ejected from the first pump 21 and passing through the second pump 22 as well as the mobile phase ejected from the second pump 22, with the resultant flow rate of the mobile phase being the same value as before the completion of the precompression.

If the material of the first pump 21 is softer than that of the specific pump mentioned earlier, or if the compressibility of the mobile phase is higher than that of the specific mobile phase mentioned earlier, the value of ΔV in equation (2) will be larger, so that the completion of the precompression will be later than the timing which was set during the uniform rotation of the cam shaft 24. In that case, after the rotation angle θ has reached 120 degrees at which the precompression would be already completed if the rotation were uniform, the rotation speed is increased so that the rotation angle at which the precompression in the first pump 21 is actually completed is reached earlier.

In this case, the rotation speed is controlled as shown by Pattern 2 in the lower section of FIG. 3: If the rotation angle at which the precompression in the first pump 21 is completed (the angle denoted by reference sign 52 in FIG. 3) is within a range from 96 degrees to 120 degrees, or in other words, if it is an angle at which both the first pump 21 and the second pump 22 are ejecting the mobile phase, the rotation speed of the cam shaft 24 is set to be higher than the speed of the uniform rotation from 96 degrees to the rotation angle at which the precompression is completed, and subsequently, the rotation speed is set to be lower than the speed of the uniform rotation until 120 degrees. By this control, the rotation angle at which the precompression is completed is reached earlier, while the situation in which the mobile phase is supplied at an excessive flow rate is prevented after the aforementioned rotation angle has been reached.

As shown by Pattern 3 in the lower section of FIG. 3, if the rotation angle at which the precompression in the first pump 21 is completed (the angle denoted by reference sign 53 in FIG. 3) is equal to or greater than 120 degrees, the rotation speed of the cam shaft 24 is set to be higher than the speed of the uniform rotation from 96 degrees to the rotation angle at which the precompression is completed, so that this rotation angle is reached earlier. In that case, the rotation speed is gradually increased within a range from 96 degrees to 120 degrees so as to prevent the mobile phase from being supplied at an excessive flow rate.

The timing of the completion of the precompression mentioned thus far may preferably be automatically set by a piece of software based on information concerning the material of the pump and the mobile phase inputted from the input unit 28 by a service person, user or the like (who is hereinafter called the "operator") of the liquid chromatograph 1. An example of the operation of this type of software is hereinafter described referring to the flowchart in FIG. 4. Although the precompression in the present embodiment is performed in the first pump 21 including the first plunger 214, the following description of the operation of the software refers to these components as the "plunger" and "pump" for generalization.

Figure 4:
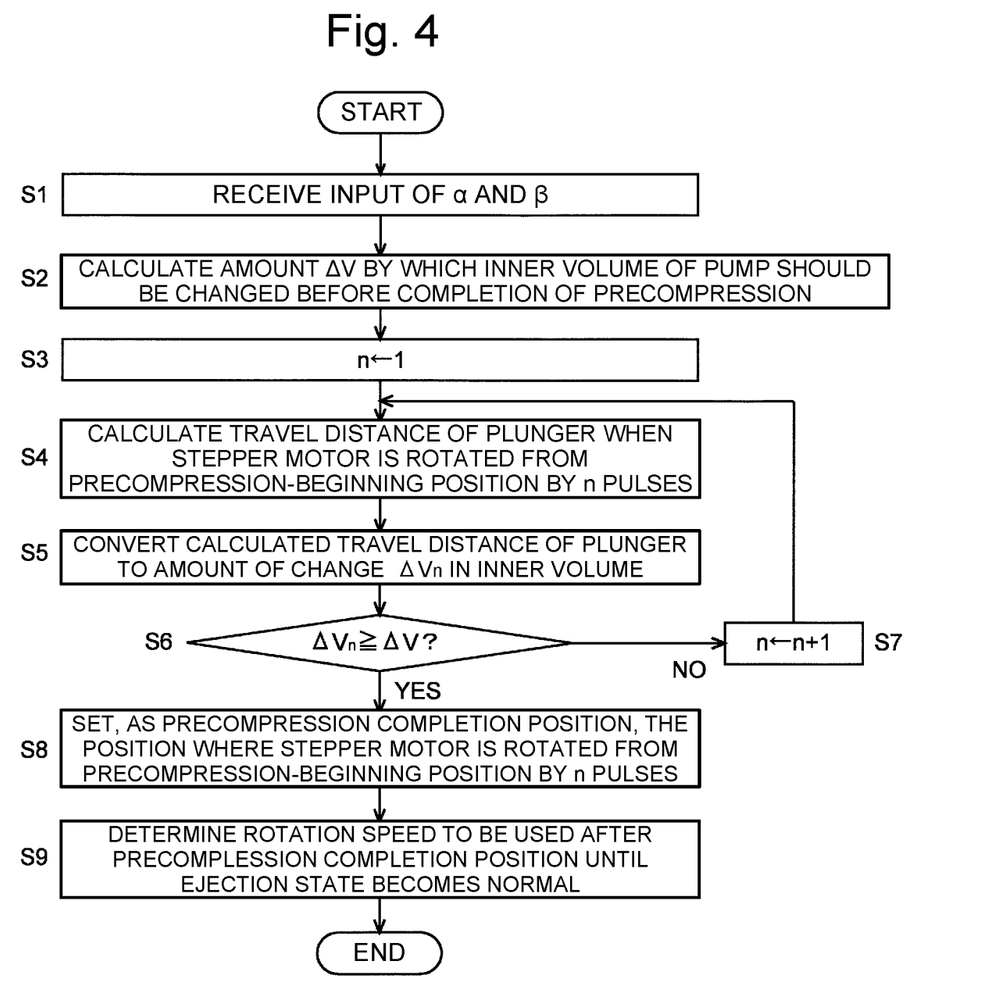
FIG. 4 is a flowchart showing a method for determining the amount of compression taking into account the amount of compression of the inner wall of the pump in the liquid-sending unit in the liquid chromatograph according to the first embodiment.

Initially, the operator performs a predetermined operation using the input unit 28, whereupon the controller 27 begins the operation by the software. The software receives an input of the values of a and R (Step 1) as follows: An input screen for allowing the operator to input information concerning the material of the pump and the mobile phase is displayed on the display unit 29. This screen may allow the operator to input the values of $\alpha$ and $\beta$ in equation (2) as the aforementioned information. Alternatively, the input screen may allow the operator to input the name of the mobile phase to be used and that of the material of the pump, or select these names from a list of options, and the controller 27 may retrieve the values of $\alpha$ and $\beta$ corresponding to those names from a storage section (not shown) in which the values of $\alpha$ and $\beta$ are recorded beforehand for each mobile phase and each material of the pump.

Next, based on the retrieved values of $\alpha$ and $\beta$, and using equation (2), the controller 27 calculates the amount $\Delta V$ by which the inner volume of the pump should be changed until the completion of the precompression (Step 2). It should be noted that the inner volume V in equation (2) is a value determined by the structure of the pump, and therefore, this value should be used, without requiring the operator to input it.

Next, the value of n is set to 1 (Step 3), and the travel distance of the plunger when the stepper motor 26 is rotated by n pulses (at this point in time, one pulse since n=1) from the position where the precompression is initiated is calculated based on the cam profile (Step 4). Then, the amount of change $\Delta V_n$ in the inner volume of the pump resulting from the movement of the plunger over the aforementioned travel distance is determined (Step 5). If $\Delta V_n$ is smaller than $\Delta V$ ("NO" in Step 6), the inner volume of the pump has not yet changed by the amount required for completing the precompression, so that the value of n is increased by one (Step 7) and the operations of Steps 4 through 6 are once more performed.

On the other hand, if $\Delta V_n$ determined in Step 5 is equal to or larger than $\Delta V$ ("YES" in Step 6), it means that the precompression is completed when the stepper motor 26 is rotated by n pulses. Accordingly, the position which the stepper motor 26 reaches when it is rotated from the beginning position of the precompression by n pulses is set as the precompression completion position (Step 8). Furthermore, the rotation speed of the cam shaft 24 from the precompression completion position to a position where the ejection state of the mobile phase from the pump becomes the normal state (which is at a rotation angle $\theta$ equal to or larger than 144 degrees in the example of FIG. 3) is set so that the flow rate of the mobile phase supplied to the third liquid-sending tube 123 becomes as uniform as possible (Step 9). By the software operation described thus far, the setting of the timing of the completion of the precompression (and the rotation speed of the cam shaft 24 in the subsequent phase) is completed.

A plurality of sets of conditions, including the timing of the completion of the precompression determined in the previously described manner, may be stored in the storage section beforehand, and those sets of conditions may be displayed on the display unit 29 for the selection by the user at the beginning of the use of the liquid chromatograph 1. In that case, the value of a (or the type of pump corresponding to that value), which only needs to be changed when the pump has been replaced, may be omitted, and only the value of R, or the kind of mobile phase corresponding to that value, may be displayed for the selection by the user at the beginning of the normal use of the liquid chromatograph 1 (needless to say, the value of a to be used in that case is a previously determined value for the pump which is actually used).

(2) Second Embodiment

Figure 5:
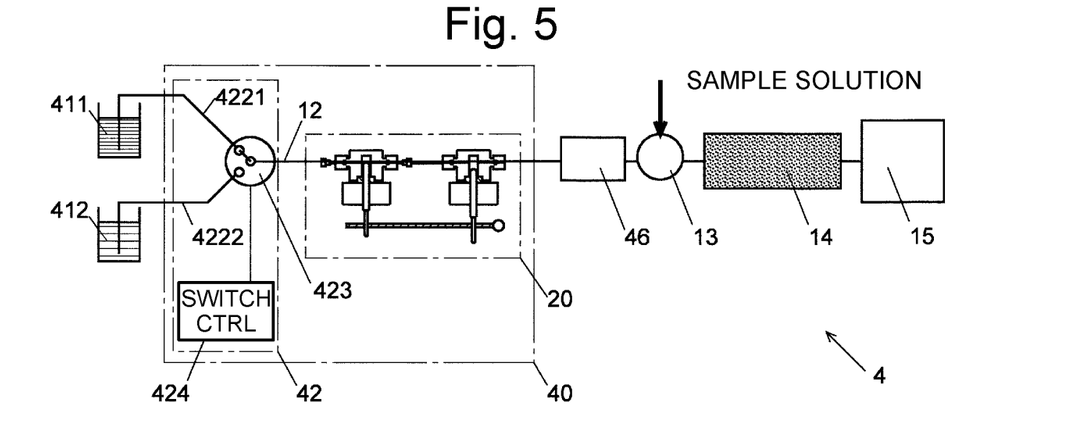
FIG. 5 is a schematic configuration diagram showing the second embodiment of the liquid chromatograph according to the present invention.
Figure 6:
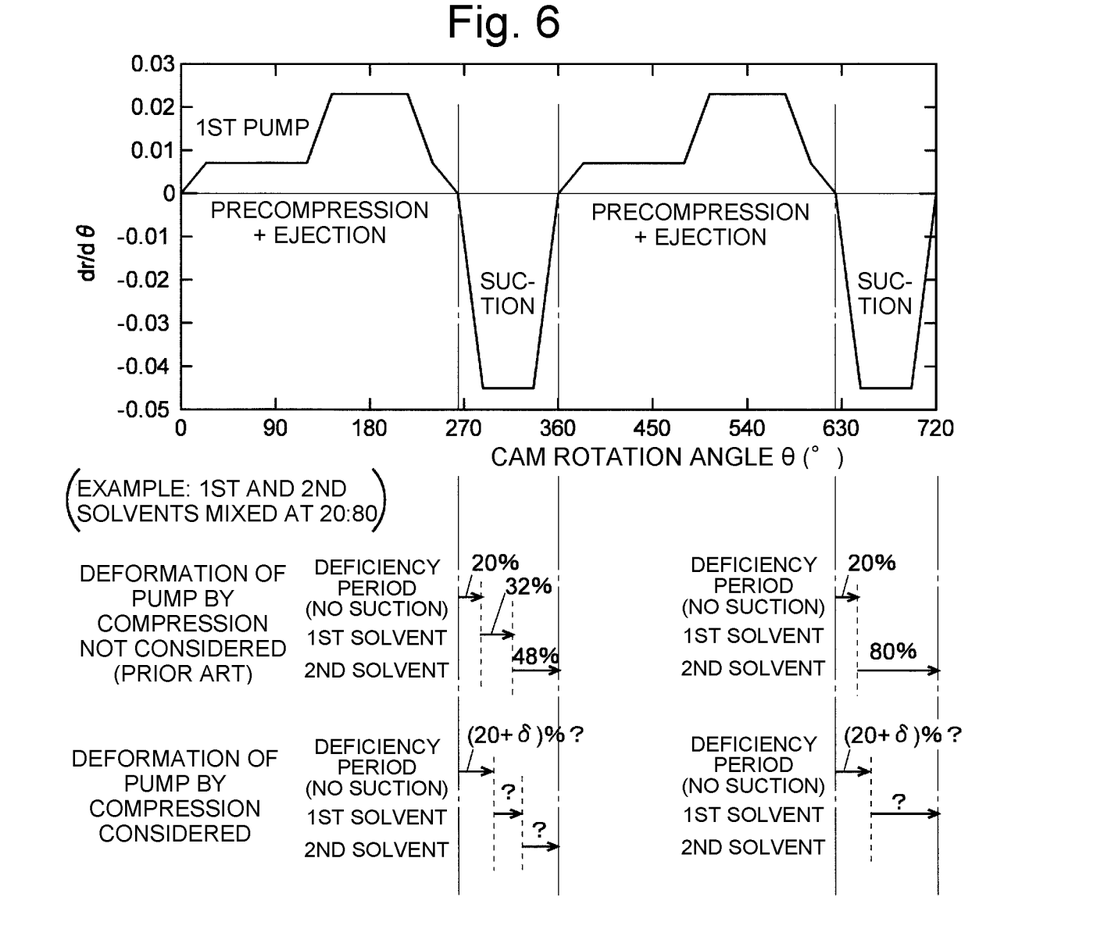
FIG. 6 is a diagram for explaining the period of time where a solvent is to be suctioned and the timing at which the solution to be suctioned is changed.
Figure 7:
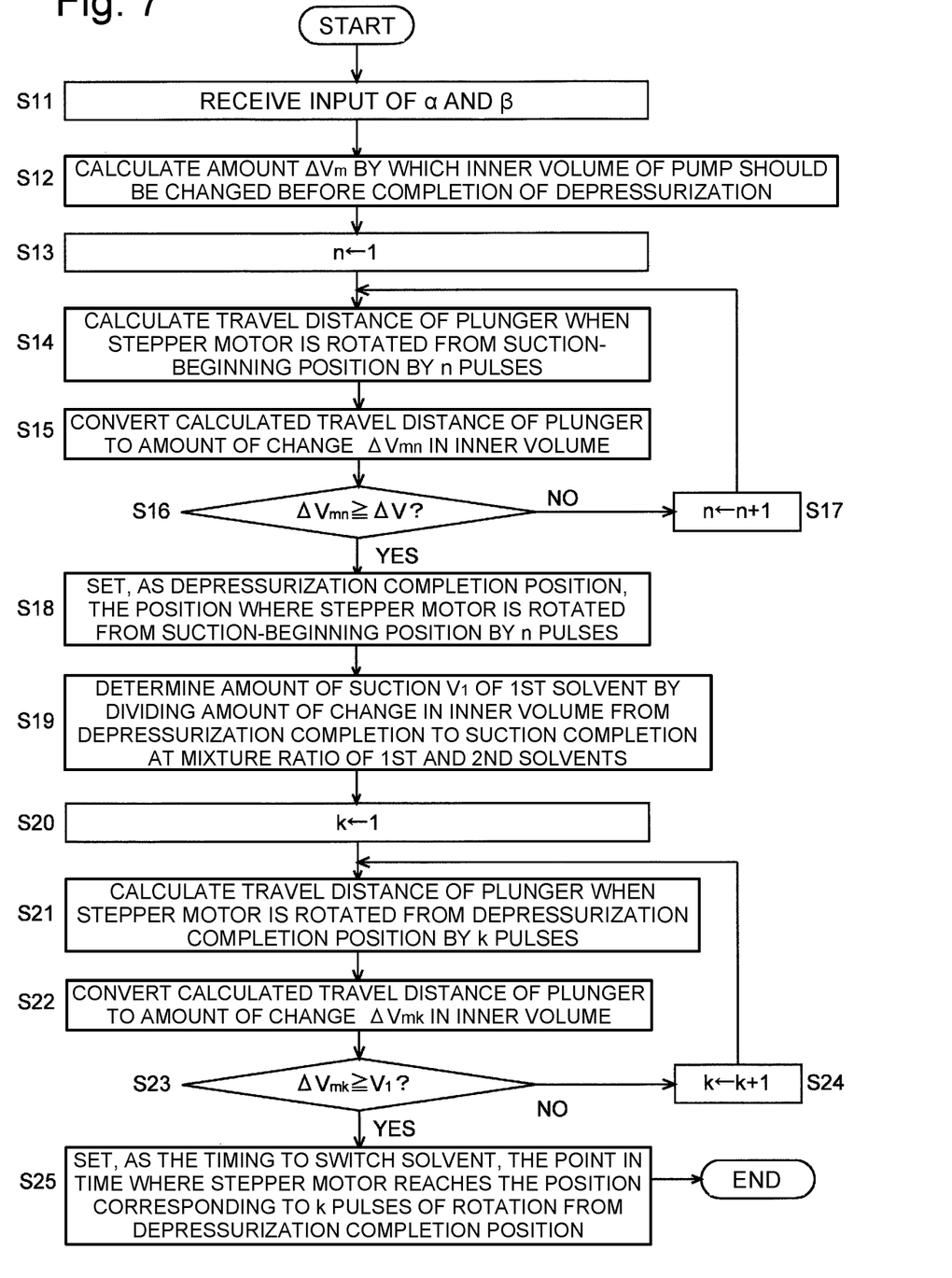
FIG. 7 is a flow chart showing a method for determining the timing to change the solution to be suctioned into the pump, taking into account the amount of compression of the inner wall of the pump in the liquid-sending unit in the liquid chromatograph according to the second embodiment.

The second embodiment of the liquid chromatograph according to the present invention is hereinafter described using FIGS. 5-7. FIG. 5 is a schematic configuration diagram showing the liquid chromatograph 4 according to the second embodiment. This liquid chromatograph 4 includes a first reservoir section 411, second reservoir section 412, solvent supplier 42, liquid-sending tube 12, pump unit 20, mixer 46, sample injection unit (injector) 13, column 14 and detector 15. The liquid-sending tube 12, sample injection unit 13, column 14 and detector 15 have identical configurations to the corresponding components in the first embodiment, and therefore, detailed descriptions of those components will be omitted.

The first reservoir section 411 and the second reservoir section 412 are reservoir tanks for holding solvents whose components are different from each other. The solvent held in the first reservoir section 411 is hereinafter called the "first solvent", and the solvent held in the second reservoir section 412 is called the "second solvent". Although two reservoir sections are provided as the first and second reservoir sections 411 and 412 in the present embodiment, three or more reservoir sections may be provided in the case of performing an analysis using a mobile phase consisting of a mixture of three or more kinds of solvents.

The solvent supplier 42 includes a first supply passage 4221 and a second supply passage 4222 extending from the first reservoir section 411 and the second reservoir section 412, respectively, a switching valve (switching mechanism) 423, and a passage switching controller 424. The switching valve 423 is a valve by which the supply passage for supplying the solvent to be introduced into the liquid-sending tube 12 is switched between the first supply passage 4221 and the second supply passage 4222. The passage switching controller 424 controls the switching valve 423 so as to switch the supply passage at a predetermined timing as will be described later.

The pump unit 20 has a similar configuration to the pump unit in the first embodiment (see FIG. 2 described earlier), in which the first pump 21 and the second pump 22, both having the cylinder wall and the plunger made of resin (PEEK), are connected in series, and two check valves (the first check valve 231 and the second check valve 232) are connected to the first suction port 211 and the first ejection port 212 of the first pump 21, respectively.

In the second embodiment, the solvent supplier 42, liquid-sending tube 12 and pump unit 20 combined together constitute a liquid-sending unit 40 (unlike the first embodiment, in which the liquid-sending unit only includes the pump unit 20).

The mixer 46 is a device for mixing the first and second solvents which flow from the pump unit 20 into the mixer 46 with a time lag. The liquid obtained by mixing the first and second solvents by the mixer 46 is supplied to the sample injection unit 13 as the mobile phase.

An operation of the liquid-sending unit 40 in the liquid chromatograph 4 according to the second embodiment is hereinafter described. The basic operation of the pump unit 20 in the liquid-sending unit 40 is similar to the operation in the first embodiment: As the cam shaft 24 rotates, the first and second cams 251 and 252 also rotate and thereby produce a reciprocating motion of each of the first and second plungers 214 and 224. When the first pump 21 is ejecting a solvent from the first ejection port 212, the second pump 22 suctions one half of the ejected solvent from the second suction port 221 while allowing the remaining half of the solvent to pass through and flow out of the second ejection port 222. When the first pump 21 is suctioning the solvent from the first suction port 211, the second pump 22 ejects the previously suctioned half of the solvent from the second ejection port 222.

The solvent supplier 42 switches the solvent to be supplied to the first pump 21 between the first solvent and the second solvent at a predetermined timing which will be described later. For the description of this operation, an operation of the liquid-sending unit 40 in a conventional liquid chromatograph is hereinafter initially described.

In a conventional liquid chromatograph, the liquid-sending unit 40 is operated to perform the switching operation so that the period of time during which the first pump 21 suctions a solvent (i.e., the period of time labeled "Suction" in FIG. 6) is assigned to the first and second solvents at the same ratio as their mixture ratio. For example, in the case where the first and second solvents should be mixed at a ratio of 20:80 during a two-cycle solvent-suctioning operation of the first pump 21, the ratio can be achieved by suctioning the first solvent to 40% and the second solvent to 60% in the first cycle of the suction period, and subsequently suctioning the second solvent to 100% in the second cycle of the suction period (it should be noted that the unit of cycles for setting the mixture ratio does not always need to be two cycles; defining a single, three or more cycles as one unit is also possible). However, it should be taken into account that each suction period includes a "deficiency period" during which the solvent cannot actually be suctioned, which is the period of time from the beginning of the suctioning operation (the backward movement of the first plunger 214) to the point in time of the completion of the precompression at which the pressure within the first pump 21 decreases to a predetermined value. Therefore, the suction of the first and second solvents at the target mixture ratio can be achieved by excluding the deficiency period and setting the ratio of the amount of suction of the first and second solvents within the remaining period of time. For example, in the previously describe example of the mixture ratio, if the deficiency period is 20% of the entire suction cycle, the remaining 80% of the suction period in the first cycle should be divided into 40% for the first solvent and 60% for the second solvent. In that case, the timing to change the solvent to be suctioned should be at the point in time where (100%-20%)×40%=32% of the entire suction cycle has elapsed since the end of the deficiency period, or 20%+32%/=52% since the beginning of the suctioning operation (see the chart labeled "Deformation of pump by compression not considered (conventional)" in FIG. 6).

However, in the case where the members of the first pump 21 are made of resin or a similar material that undergoes deformation due to a pressure, the first cylinder 213 will be deformed due to the pressure applied to the solvent which remains at the completion of the ejection before the suctioning operation is initiated. Consequently, as compared to the case with no deformation due to the pressure, the position of the first plunger 214 at the completion of the depressurization will be different, so that the timing at which the solvent actually begins to be suctioned will also be different. Therefore, the timing to change the solvent to be suctioned needs to be changed from the timing in the case where the deformation due to the pressure does not occur (see the chart labeled "Deformation of pump due to compression considered" in FIG. 6).

Let $V_m$ be the inner volume of the first pump 21 at the beginning of the suctioning operation, let $\Delta V_m$ and $\Delta P_m$ be the changes in inner volume and pressure from the beginning of the suctioning operation at a certain point in time within a period from the beginning of the suctioning operation to the completion of the depressurization, respectively, let $\beta_m$ be the compressibility of the solvent remaining in the first pump 21 at the beginning of the suctioning operation, and let $\alpha_m \Delta P_m$ be the amount of change in the inner volume of the first pump 21 due to the deformation caused by the change in the pressure within the first pump 21. Since no solvent is suctioned into or ejected from the first pump 21 during the period of time from the beginning of the suctioning operation to the completion of the depressurization, the relationship expressed by the following equation holds true as in the case of the precompression for the ejecting operation when the deformation caused by the pressure change is not considered:

$$\Delta V_m = \beta_m V_m \Delta P_m \tag{3}$$

Similarly, the relationship expressed by the following equation holds true as in the case of the precompression when the deformation caused by the pressure change is considered:

$$\Delta V_m = (\beta_m V_m + \alpha_m)\Delta P_m \tag{4}$$

In the present embodiment, this relationship (4) is used as a basis for determining the relationship between $\Delta V_m$ and $\Delta P_m$ with respect to the movement of the first plunger 214. Then, the point in time where the first plunger 214 reaches the position where $\Delta V_m$ corresponds to $\Delta P_m$ at which the pressure within the first pump 21 is lowered to a value at which the solvent can be suctioned (i.e., at which the depressurization is completed) is located as the point in time of the completion of the depressurization.

The value of $\alpha_m$ depends on the material of the pump, and therefore, does not need to be changed as long as the first pump 21 is not replaced by a new pump made of a different material. Therefore, it is normally possible to assume that the value of $\alpha_m$ is a fixed constant. This allows $\Delta V_m$ at the completion of the depressurization to be determined by inputting only the compressibility $\beta_m$ according to the component of the mobile phase remaining in the first pump 21 (which is the solvent suctioned in the immediately preceding suction phase; if a plurality of solvents were suctioned in the previous suction phase, the mixture of those solvents should be the remaining solvent). When the first pump 21 has been replaced by a new one, $\alpha_m$ should be changed to a value determined by the material of the new first pump 21. After $\Delta V_m$ at the completion of the depressurization has been determined, the conventional method can be similarly employed to determine the timing to switch between the first and second solvents by setting the ratio of the amount of suction of the first and second solvents within the period of time which remains for the first plunger 214 to further travel from the position at that moment.

Similar to the first embodiment, it is preferable in the second embodiment to provide a controller 27 and an input unit 28 (not shown) as well as use a piece of software which automatically performs the settings based on information concerning the material of the pump and the solvents inputted from the input unit 28 by an operator. An example of the operation of this type of software is hereinafter described referring to the flowchart in FIG. 7. Although the description of the second embodiment thus far has been concerned with an example of the operation of the first pump 21 including the first plunger 214, the following description refers to these components as the "plunger" and "pump" for generalization.

The operator performs a predetermined operation using the input unit 28 to initiate the operation of the software. Then, the controller 27 receives an input of the values of $\alpha_m$ and $\beta_m$ (Step 11). The operator may directly input the values of $\alpha_m$ and $\beta_m$. Alternatively, the software may allow the operator to input the name of the mobile phase (the kinds of solvents and their mixture ratio) to be used and that of the material of the pump, or select these names from a list of options, and the controller 27 may retrieve the values of $\alpha_m$ and $\beta_m$ corresponding to those names from a storage section (not shown) in which the values of $\alpha_m$ and $\beta_m$ are recorded beforehand for each mobile phase and each material of the pump.

Next, based on the retrieved values of $\alpha_m$ and $\beta_m$, and using equation (4), the controller 27 determines the value of $\Delta V_m$ at the completion of the depressurization (Step 12). It should be noted that the inner volume $V_m$ at the beginning of the suctioning operation in equation (4) is a value determined by the structure of the pump, and therefore, this value should be used, without requiring the operator to input it.

Next, the value of n is set to 1 (Step 13), and the travel distance of the plunger when the stepper motor 26 is rotated by n pulses (at this point in time, one pulse since n=1) from the position where the suctioning operation is initiated is calculated based on the cam profile (Step 14). Then, the amount of change $\Delta V_m$ in the inner volume of the pump resulting from the movement of the plunger over the aforementioned travel distance is determined (Step 15). If $\Delta V_{mn}$ is smaller than $\Delta V_m$ ("NO" in Step 16), the depressurization is not yet completed, so that the value of n is increased by one (Step 17) and the operations of Steps 14 through 16 are once more performed.

On the other hand, if $\Delta V_{mn}$ determined in Step 15 is equal to or larger than $\Delta V_m$ ("YES" in Step 16), it means that the depressurization is completed when the stepper motor 26 is rotated by n pulses. Accordingly, the position which the stepper motor 26 reaches when it is rotated from the beginning position of the suctioning operation by n pulses is set as the depressurization completion position (Step 18).

Subsequently, the amount $V_1$ of the first solvent to be suctioned during a period from the completion of the depressurization to the point in time to switch the solvent is calculated by dividing the amount of change in the inner volume of the pump from the completion of the depressurization to the completion of the suctioning operation at a ratio corresponding to the mixture ratio of the first and second solvents to be mixed with each other (Step 19).

Next, the value of k is set to 1 (Step 20), and the travel distance of the plunger when the stepper motor 26 is rotated by k pulses (at this point in time, one pulse since k=1) from the position where the depressurization is completed is calculated based on the cam profile (Step 21). Then, the amount of change $\Delta V_{mk}$ in the inner volume of the pump resulting from the movement of the plunger over the aforementioned travel distance from the position of the completion of the depressurization is determined (Step 22). If this amount of change $\Delta V_{mk}$ is smaller than the amount $V_1$ of suction of the first solvent ("NO" in Step 23), the value of k is increased by one (Step 24) and the operations of Steps 21 through 23 are once more performed. On the other hand, if $\Delta V_{mk}$ determined in Step 21 is equal to or larger than $V_1$ ("YES" in Step 23), it means that the timing to switch the solvent is reached when the stepper motor 26 is rotated by k pulses from the completion of the depressurization. Accordingly, the timing at which the stepper motor 26 reaches a rotational position which corresponds to k pulses from the completion of the depressurization is set as the timing to switch the solvent (Step 25). Thus, the entire sequence of operations is completed.

The present invention is not limited to the previously descried embodiments. They can be modified in various forms within the gist of the present invention.

Figure 8:
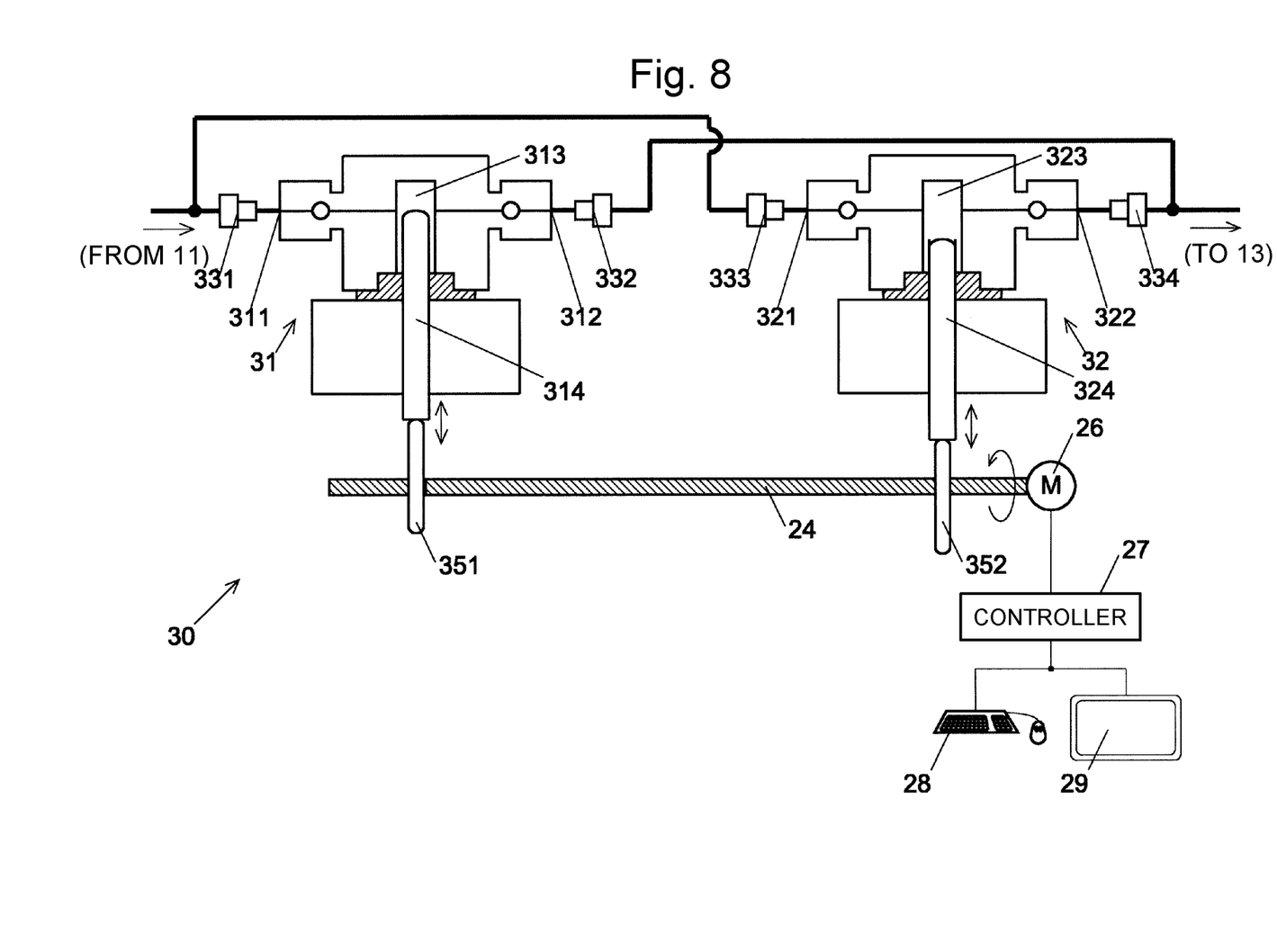
FIG. 8 is a diagram showing the configuration of the liquid-sending unit in a liquid chromatograph according to a modified example.

For example, the pump unit 20 used in the previous embodiments consists of the first pump 21 and the second pump 22 connected in series. Alternatively, as shown in FIG. 8, a pump unit 30 which consists of a first pump 31 and a second pump 32 connected in parallel may be used. In the case of connecting the pumps in parallel in this manner, a first check valve 331 and a second check valve 332 are provided for the first suction port 311 and the first ejection port 312 of the first pump 31, respectively, as well as a third check valve 333 and a fourth check valve 334 for the second suction port 321 and the second ejection port 322 of the second pump 32, respectively. Additionally, similar to the first and second pumps 21 and 22 in the previous embodiments, the first pump 31 includes a first cylinder 313 and a first plunger 314, while the second pump 32 includes a second cylinder 323 and a second plunger 324. Both the first pump 31 and the second pump 32 are entirely made of resin, although a pump in which the portions that come in contact with the mobile phase are made of resin while the other portions are made of metal may also be used. In the present modified example, the precompression before the ejection of the mobile phase is performed not only in the first pump 31 but also in the second pump 32 since this pump is provided with the fourth check valve 34. The timing of the precompression in the second pump 32 can be determined in a similar manner to the first embodiment based on equation (2), taking into account the amount of change $\alpha \Delta P$ in the inner volume of the pump caused by the pressure change as well as the compressibility $\beta$ of the mobile phase. This also applies in the case of the first pump 31. The shapes of the first and second cams 351 and 352 should be appropriately determined according to the operation of the pumps in the parallel connection. In the case of performing a low-pressure gradient control, the point in time of the completion of the depressurization can be determined in a similar manner to the second embodiment, taking into account the amount of change $\alpha_m \Delta P_m$ in the inner volume of each pump caused by the pressure change as well as the compressibility $\beta_m$ of the solvent remaining in the pump.

[Additional Notes]

A person skilled in the art can understand that the previously described illustrative embodiments are specific examples of the modes of the present invention noted below.

(Clause 1)

A liquid chromatograph according to Clause 1 is a liquid chromatograph including a liquid-sending unit configured to send a mobile phase held in a reservoir section to a column through a liquid-sending tube at a predetermined pressure, where:

the liquid-sending unit includes:
- a pump including: a pump chamber, a plunger configured to reciprocate in the pump chamber, a suction port provided for the pump chamber and configured to be connected to the reservoir section, as well as an ejection port provided for the pump chamber and configured to be connected to the liquid-sending tube directly or via another pump;
- a check valve connected to the ejection port;
- an input section configured to allow for input of information concerning the compressibility of the mobile phase and information concerning the amount of change in the inner volume of the pump chamber caused by a change in the pressure within the pump chamber; and
- a pressure application controller configured to control the plunger, based on the information inputted through the input section, in such a manner that the pressure applied to the mobile phase within the pump chamber becomes a check-valve-opening pressure at which the check valve opens, before the mobile phase suctioned from the suction port is to be ejected from the ejection port.

The pressure of the mobile phase within the pump chamber actually depends on not only the compressibility of the mobile phase mentioned earlier, but also the inner volume of the pump chamber which changes due to the compression of the wall of the pump chamber caused by the pressure application. The amount of change in the inner volume of the pump chamber depends on the material of the wall of the pump chamber. This change is negligibly small if the material is a metallic material, whereas it cannot be ignored if the material is a resin or similar material that easily deforms when compressed. Accordingly, the liquid chromatograph according to Clause 1 controls the plunger based on not only the compressibility of the mobile phase but also the amount of change in the inner volume of the pump chamber caused by a change in pressure, in such a manner that the pressure applied to the mobile phase within the pump chamber becomes a check-valve-opening pressure before the mobile phase suctioned from the suction port is to be ejected from the ejection port. The plunger control can be performed by adjusting the position, moving speed and other parameters of the plunger with respect to time, while the amount of change in the inner volume of the pump chamber can be determined by a preliminary experiment (or the like). By controlling the plunger in this manner, the mobile phase within the pump chamber reaches a pressure capable of opening the check valve at the point in time where the mobile phase is to be ejected from the ejection port, so that the mobile phase can be ejected from the pump at an appropriate timing.

Additionally, an operator using the input section enters information concerning the compressibility of the mobile phase and information concerning the amount of change in the inner volume of the pump chamber resulting from the compression of the wall of the pump chamber and other members caused by a change in the pressure within the pump chamber. Based on these pieces of information, the pressure application controller controls the aforementioned pressure, i.e., the pressure applied to the mobile phase within the pump. Therefore, the pressure control can be appropriately performed even when the compressibility of the mobile phase or the amount of change in the inner volume of the pump chamber has been changed due to a change in the kind of mobile phase to be used or due to the replacement of the pump.

The liquid chromatograph according to Clause 1 is applicable in both the case where the liquid-sending unit is a parallel connection type and the case where the liquid-sending unit is a series connection type. In the case of the parallel connection type, each of the two pumps corresponds to the "pump" in Clause 1 (as well as in Clauses 2 and 3). In this case, a check valve is connected to each of the suction and ejection ports of each of the two pumps, and the pressure in each of the two pumps is independently controlled by the pressure application controller. In the case of the series connection type, the pump on the upstream side of the two pumps corresponds to the "pump" in Clause 1 (as well as in Clauses 2 and 3). In this case, a check valve is connected to each of the suction and ejection ports of the pump on the upstream side, and the pressure of this pump is controlled by the pressure application controller, whereas the pump on the downstream side has neither of the check valves connected to the suction port and the ejection port.

(Clause 2)

In the liquid chromatograph according to Clause 2, which is one mode of the liquid chromatograph according to Clause 1, the information concerning the amount of change is information concerning the amount of deformation of a material used for the pump chamber.

The liquid chromatograph according to Clause 2 can appropriately perform the pressure control even when the amount of deformation is changed due to a change in the material used for the pump chamber.

(Clause 3)

In the liquid chromatograph according to Clause 3, which is one mode of the liquid chromatograph according to Clause 1 or 2, the pump further includes:
- a cam configured to convert a rotational motion into a reciprocating motion of the plunger; and
- a rotation mechanism configured to rotate the cam, and the pressure application controller is configured to control the plunger by operating the rotation mechanism such that, when a check-valve-open rotation angle which is a rotation angle of the cam at which the pressure reaches the check-valve-opening pressure is smaller than a predetermined reference rotation angle, the rotation mechanism decreases the rotation speed of the cam within an angular range from the check-valve-open rotation angle to the reference rotation angle, and when the check-valve-open rotation angle is larger than the reference rotation angle, the rotation mechanism increases the rotation speed of the cam within an angular range from the reference rotation angle to the check-valve-open rotation angle.

In the liquid chromatograph according to Clause 3, when the check-valve-open rotation angle is smaller than the reference rotation angle, the precompression is completed earlier, after which the mobile phase is simultaneously ejected from both the pump in which the precompression has been performed and the other pump. Therefore, the rotation speed of the cam is decreased so as to prevent the mobile phase from being supplied at an excessive flow rate. On the other hand, when the check-valve-open rotation angle is larger than the reference rotation angle, the completion of the precompression would be delayed if the rotation speed were unchanged. Therefore, the rotation speed of the cam is increased so as to reach the check-valve-open rotation angle at an earlier timing. By controlling the speed of the cam in this manner, the mobile phase can be supplied at an appropriate timing of the precompression and in an appropriate amount of ejection even when the check-valve-open rotation angle changes depending on the compressibility of the mobile phase and the amount of compression of the inner wall of the pump.

(Clause 4)

A liquid chromatograph according to Clause 4 is a liquid chromatograph including a liquid-sending unit configured to send a mobile phase to a column through a liquid-sending tube at a predetermined pressure, the mobile phase consisting of a mixture of a plurality of solvents whose components are different from each other, where:

the liquid-sending unit includes:
  a solvent supplier including a plurality of solvent supply passages and a switching mechanism configured to select one solvent supply passage from the plurality of solvent supply passages in a switchable manner;
  a pump including: a pump chamber, a plunger configured to reciprocate within the pump chamber, a suction port provided for the pump chamber and configured to be connected to the solvent supplier, as well as an ejection port provided for the pump chamber and configured to be connected to the liquid-sending tube directly or via another pump;
  an input section configured to allow for input of information concerning the compressibility of the mobile phase and information concerning the amount of change in the inner volume of the pump chamber caused by a change in the pressure within the pump chamber; and
  a passage-switching controller configured to control the timing of the switching of the solvent supply passages by the switching mechanism, based on the information inputted through the input section.

In a low-pressure gradient control, if a change in the inner volume of the pump chamber occurs due to a change in the pressure within the pump chamber, the timing at which the depressurization is completed and the suction of the solvent becomes possible will change as compared to the case where no change in inner volume occurs. If this change in the timing of the completion of the depressurization is not considered in switching the solvent to be introduced into the pump chamber, a discrepancy occurs between the actual mixture ratio and the target value. Accordingly, in the liquid chromatograph according to Clause 4, the timing of the switching of the solvent supply passages by the switching mechanism is controlled based on the change in the inner volume of the pump chamber caused by a change in the pressure within the pump chamber in addition to the compressibility of the solvent within the pump chamber. By this control, the timing of the switching of the solvent supply passages can be determined corresponding to a change in the timing of the completion of the depressurization, so that a plurality of solvents can be mixed at the target mixture ratio.

Additionally, in the liquid chromatograph according to Clause 4, as in the liquid chromatograph according to Clause 1, the timing of the switching of the solvent supply passages can be appropriately controlled even when the compressibility of the solvent or the amount of change in the inner volume of the pump chamber has been changed due to a change in the kind of solvent to be used or due to the replacement of the pump.

REFERENCE SIGNS LIST 1, 4 . . . Liquid Chromatograph
11 . . . Reservoir Tank
12 . . . Liquid-Sending Tube
121 . . . First Liquid-Sending Tube
122 . . . Second Liquid-Sending Tube
123 . . . Third Liquid-Sending Tube
13 . . . Sample Injection Unit (Injector)
14 . . . Column
15 . . . Detector
20, 30 . . . Pump Unit (Liquid-Sending Unit in First Embodiment)
21, 31 . . . First Pump
211, 311 . . . First Suction Port
212, 312 . . . First Ejection Port
213, 313 . . . First Cylinder (First Pump Chamber)
214, 314 . . . First Plunger
22, 32 . . . Second Pump
221, 321 . . . Second Suction Port
222, 322 . . . Second Ejection Port
223, 323 . . . Second Cylinder (Second Pump Chamber)
224, 324 . . . Second Plunger
231, 331 . . . First Check Valve
232, 332 . . . Second Check Valve
24 . . . Cam Shaft
251, 351 . . . First Cam
252, 352 . . . Second Cam
26 . . . Stepper Motor
27 . . . Controller
28 . . . Input Unit
29 . . . Display Unit
333 . . . Third Check Valve
334 . . . Fourth Check Valve
40 . . . Liquid-Sending Unit
411 . . . First Reservoir Section
412 . . . Second Reservoir Section
42 . . . Solvent Supplier
4221 . . . First Supply Passage (One of The Plurality of Solvent Supply Passages)
4222 . . . Second Supply Passage (Idem)
423 . . . Switching Valve
424 . . . Switching Controller
46 . . . Mixer
51, 52, 53 . . . Rotation Angle at Completion of Precompression (Check-Valve-Open Rotation Angle)

The invention claimed is:

1. A liquid chromatograph including a liquid-sending unit configured to send a mobile phase held in a reservoir section to a column through a liquid-sending tube at a predetermined pressure, wherein:

the liquid-sending unit comprises:
  a pump including: a pump chamber, a plunger configured to reciprocate within the pump chamber, a suction port provided for the pump chamber and configured to be connected to the reservoir section, as well as an ejection port provided for the pump chamber and configured to be connected to the liquid-sending tube directly or via another pump;

a check valve connected to the ejection port;

an input section configured to allow for input of information concerning a compressibility of the mobile phase and information concerning an amount of change in an inner volume of the pump chamber caused by a change in a pressure within the pump chamber; and a pressure application controller configured to control the plunger, based on the information inputted through the input section, in such a manner that a pressure applied to the mobile phase within the pump chamber becomes a check-valve-opening pressure at which the check valve opens, before the mobile phase suctioned from the suction port is to be ejected from the ejection port.

2. The liquid chromatograph according to claim 1, wherein the information concerning the amount of change is information concerning an amount of deformation of a material used for the pump chamber.

3. The liquid chromatograph according to claim 1, wherein the pump further includes:

a cam configured to convert a rotational motion into a reciprocating motion of the plunger; and a rotation mechanism configured to rotate the cam, and the pressure application controller is configured to control the plunger by operating the rotation mechanism such that, when a check-valve-open rotation angle which is a rotation angle of the cam at which the pressure reaches the check-valve-opening pressure is smaller than a predetermined reference rotation angle, the rotation mechanism decreases a rotation speed of the cam within an angular range from the check-valve-open rotation angle to the reference rotation angle, and when the check-valve-open rotation angle is larger than the reference rotation angle, the rotation mechanism increases the rotation speed of the cam within an angular range from the reference rotation angle to the check-valve-open rotation angle.

4. A liquid chromatograph including a liquid-sending unit configured to send a mobile phase to a column through a liquid-sending tube at a predetermined pressure, the mobile phase consisting of a mixture of a plurality of solvents whose components are different from each other, wherein:

the liquid-sending unit comprises:

a solvent supplier including a plurality of solvent supply passages and a switching mechanism configured to select one solvent supply passage from the plurality of solvent supply passages in a switchable manner;

a pump including: a pump chamber, a plunger configured to reciprocate within the pump chamber, a suction port provided for the pump chamber and configured to be connected to the solvent supplier, as well as an ejection port provided for the pump chamber and configured to be connected to the liquid-sending tube directly or via another pump;

an input section configured to allow for input of information concerning a compressibility of the mobile phase and information concerning an amount of change in an inner volume of the pump chamber caused by a change in a pressure within the pump chamber; and a passage-switching controller configured to control a timing of a switching of the solvent supply passages by the switching mechanism, based on the information inputted through the input section.

* * * * *